(12) United States Patent
Adame et al.

(10) Patent No.: US 10,733,263 B2
(45) Date of Patent: Aug. 4, 2020

(54) ACCURACY AND TIME-TO-SOLUTION IN SOLVING COMBINATORIAL OPTIMIZATION PROBLEMS WITH QUANTUM ANNEALERS BY USING ANNEAL OFFSETS

(71) Applicant: QC Ware Corp., Moffett Field, CA (US)

(72) Inventors: Juan Ignacio Adame, Palo Alto, CA (US); Peter McMahon, Palo Alto, CA (US)

(73) Assignee: QC Ware Corp., Palo Alto, CA (US)

( * ) Notice: Subject to any disclaimer, the term of this patent is extended or adjusted under 35 U.S.C. 154(b) by 47 days.

(21) Appl. No.: 16/148,742

(22) Filed: Oct. 1, 2018

(65) Prior Publication Data

US 2019/0102353 A1    Apr. 4, 2019

Related U.S. Application Data

(60) Provisional application No. 62/567,036, filed on Oct. 2, 2017.

(51) Int. Cl.
*G06F 17/11*    (2006.01)
*G06N 10/00*    (2019.01)
*G06N 5/00*    (2006.01)

(52) U.S. Cl.
CPC .............. *G06F 17/11* (2013.01); *G06N 5/003* (2013.01); *G06N 10/00* (2019.01)

(58) Field of Classification Search
None
See application file for complete search history.

(56) References Cited

U.S. PATENT DOCUMENTS

| | | | |
|---|---|---|---|
| 2009/0299947 A1* | 12/2009 | Amin ..................... | G06N 10/00 706/52 |
| 2011/0054876 A1* | 3/2011 | Biamonte ............. | B82Y 10/00 703/15 |
| 2011/0231462 A1* | 9/2011 | Macready ............. | B82Y 10/00 708/231 |
| 2014/0097405 A1* | 4/2014 | Bunyk .................. | H01L 49/006 257/31 |
| 2015/0032994 A1* | 1/2015 | Chudak ................. | G06N 10/00 712/42 |
| 2016/0132785 A1* | 5/2016 | Amin ..................... | G06F 15/82 712/42 |

* cited by examiner

*Primary Examiner* — Michael D. Yaary
(74) *Attorney, Agent, or Firm* — Fenwick & West LLP

(57) ABSTRACT

Quantum computing is a computational paradigm for solving (exactly or approximately) difficult combinatorial optimization problems. One degree of freedom that is available is the so-called annealing schedule, which defines how the quantum computation evolves from the start of the computation to the end of the computation. This schedule is defined by anneal offsets, which can be different for each quantum bit (qubit) in the quantum computer. The choice of annealing schedule can have a dramatic impact on the performance of the computer. In this disclosure we provide a method for selecting and/or modifying the annealing schedule based on the problem to be solved.

20 Claims, 2 Drawing Sheets

ACCURACY AND TIME-TO-SOLUTION IN SOLVING COMBINATORIAL OPTIMIZATION PROBLEMS WITH QUANTUM ANNEALERS BY USING ANNEAL OFFSETS

CROSS-REFERENCE TO RELATED APPLICATION(S)

This application claims priority under 35 U.S.C. § 119(e) to U.S. Provisional Patent Application Ser. No. 62/567,036, "A Method For Improving The Accuracy And Time-To-Solution In Solving Combinatorial Optimization Problems With Quantum Annealers By Using Anneal Offsets," filed Oct. 2, 2017. The subject matter of all of the foregoing is incorporated herein by reference in their entirety.

BACKGROUND

1. Technical Field

The present disclosure relates to the technical fields of quantum annealing and adiabatic quantum computing. More particularly, it relates to tuning the internal working mechanisms of a quantum annealer or adiabatic quantum computer such that the performance of the quantum computing device is improved.

2. Description of Related Art

Quantum computing devices (QCD), which include quantum annealers and adiabatic quantum computers, implement computational paradigms for solving (exactly or approximately) difficult combinatorial optimization problems. One of the main choices that is available to a QCD engineer (engineer) is the so-called annealing schedule, which defines how the computer evolves from the start of the computation to the end of the computation. This schedule can be different for each quantum bit (qubit) in the QCD. The choice of schedule can have a dramatic impact on the performance of the quantum computing device.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is disclosed.

In one aspect, the user of a quantum computing device (QCD) wants to find a minimum of the combinatorial optimization problem $$G = \Sigma_i h_i s_i + \Sigma_{(i,j)} J_{ij} s_i s_j, \quad (1)$$

where G is the objective function to be minimized by the QCD. The $h_i$ and $J_{ij}$ are arrays of coefficients specified by the user and define the minimization problem to be solved. The variables $s_i$ can be either +1 or −1. The set of +1 and −1 for $s_i$ that yields the minimum value of G is the solution desired.

Figure 1:
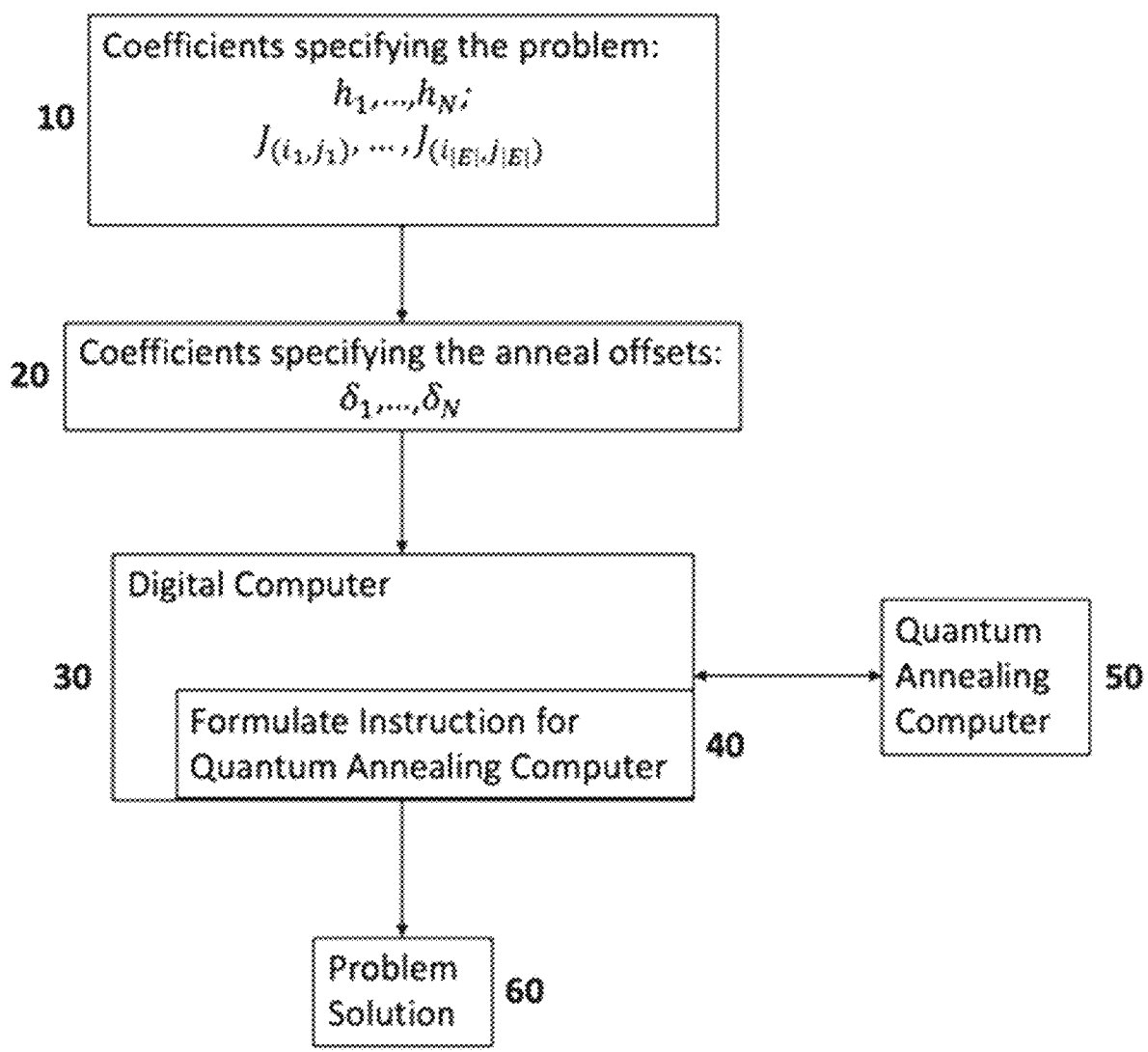
FIG. 1 is a schematic depicting the workflow involved in solving an optimization problem in a quantum computing device.

FIG. 1 is a schematic depicting the workflow involved in solving an optimization problem in a quantum computing device 50. In this figure, this is accomplished by using a traditional digital computer 30 to create the instruction 40 that is executed by the QCD 50. The first component 10 includes the arrays of coefficients specifying the minimization problem to be solved. This is typically provided by the user, typically in electronic form. The array 20 of coefficients $\delta_1, \ldots, \delta_N$ specify the anneal offsets to be used by the QCD. This is the annealing schedule, which is determined as described below. The digital computer 30 converts the arrays of coefficients 10 and 20 into an instruction 40 for the QCD 50. Once the instruction has been formulated, the instruction formulation module 40 running on the digital computer 30, sends the instruction via a network connection to the QCD 50. The QCD 50 solves for the bit string, $s_1, \ldots, s_N$, that most likely represents the best selection of the $s_1, \ldots, s_N$ for the user. The solution is returned to the digital computer 30 and the final solution to the minimization problem is output 60 to the user. The information from the digital computer 30 may be sent to the QCD 50 using standard network protocols. The QCD could be located in the same physical facility as the digital computer, or it could be at a remote location connected by the Internet.

The choice of coefficients 20 can have a dramatic impact on the performance of the quantum computer. Denote by $\delta_i$ the anneal offset applied on qubit i and $\delta_j$ the anneal offset applied on qubit j. If $\delta_i > \delta_j$, then this has the effect that qubit i is annealed after qubit j. In one approach, the $\delta_i$ are set to relatively large positive values for qubits i that are relatively unimportant in deciding what are good values of the $s_1, \ldots, s_N$. Similarly, the $\delta_i$ are set to relatively large negative values for qubits i that play a larger role in determining what are good values of the $s_1, \ldots, s_N$. Several examples are provided below. In contrast, under a conventional annealing schedule, the anneal offsets are chosen such that they are the same for all qubits (i.e., $\delta_1 = \ldots = \delta_N$, typically $\delta_1 = \ldots = \delta_N = 0$).

An example method for setting an annealing schedule is to look at the magnitude of the local field of each qubit, on the basis that the larger the local field typically is, the larger the role that qubit plays in determining the optimal values of the $s_1, \ldots, s_N$. In one approach, let $E(i) \equiv \{j : J_{ij} \neq 0\}$ denote the set of all qubits j that interact non-trivially with qubit i. Furthermore, let $i_1, \ldots, i_{|E(i)|}$ denote an enumeration of this set, i.e., $E(i) = \{i_1, \ldots, i_{|E(i)|}\}$. Then the local field of qubit i, which depends on qubits $j \in E(i)$, is denoted $F_i(s_{i_1}, \ldots, s_{i_{|E(i)|}})$, and is defined as $$F_i(s_{i_1}, \ldots, s_{i_{|E(i)|}}) = h_i + \Sigma_{j=1}^{|E(i)|} J_{ij} s_{ij} \quad (2)$$

Next we define the quantity $$\Delta E^i_{mean} \equiv \frac{1}{2^{|E(i)|}} \sum\nolimits_{s_{i_1}, \ldots, s_{i_{|E(i)|}} \in \{-1, +1\}} |F_i(s_{i_1}, \ldots, s_{i_{|E(i)|}})|, \quad (3)$$

which is the average of the absolute value of the local field of qubit i, weighted uniformly over all possible values of $s_{i_1}, \ldots, s_{i_{|E(i)|}}$. Next we define the quantity $$\Delta E_{max} \equiv \max_{i \in \{1,\ldots,N\}} \Delta E^i_{mean}, \quad (4)$$

which is the maximum of these averages over all qubits. Next we normalize the averages and obtain the normalized ratios $$r_i \equiv \frac{\Delta E^i_{mean}}{\Delta E_{max}} \cdot \Delta E^i_{mean} \quad (5\text{?})$$

is always positive because it is an average of magnitudes and $\Delta E_{max}$ is the largest of these values, so ratio $r_i$ falls in the range 0 to 1, with $r_i$ close to 0 for qubits i with small local field magnitudes and $r_i$ close to 1 for qubits i with large local field magnitudes.

If one wishes to use an anneal offset range of magnitude $2\delta_{range}$ (i.e., operating range of $-\delta_{range}$ to $+\delta_{range}$), then we can set the offsets to be $$\delta_i(r_i) = \delta_{range}(1 - 2r_i). \quad (5)$$

That is, the anneal offset $\delta_i$ is close to $+\delta_{range}$ for qubits i with small local field magnitudes and close to $-\delta_{range}$ for qubits i with large local field magnitudes. In some cases, different offset ranges might be available for different qubits, and it could be that the function in Equation 5 assigns an anneal offset to a qubit that the hardware cannot physically realize. If $\delta_i^{max}$ is the maximum offset value that can be applied on qubit i allowed by the hardware, and $\delta_i^{min}$ is the minimum such offset value, we can ensure that $\delta_i \in [\delta_i^{min}, \delta_i^{max}]$ by clipping values that would otherwise fall outside the operating range:

$$\delta_i(r_i) \equiv \begin{cases} \delta_i^{max} & \text{if } \delta_{range}(1 - 2r_i) > \delta_i^{max} \\ \delta_i^{min} & \text{if } \delta_{range}(1 - 2r_i) < \delta_i^{min} \\ \delta_{range}(1 - 2r_i) & \text{else} \end{cases} \quad (6)$$

This is just one example for setting the anneal offsets. One generalization of this strategy is to modify $\Delta E^i_{mean}$ by introducing nonnegative, normalized weights for each qubit i and each possible configuration of its neighbors $i_1, \ldots, i_{|E(i)|}$. We denote this weight $$p^{(i)}_{s_{i_1},\ldots,s_{i_{|E(i)|}}}.$$

Next, we replace the uniformly weighted average $\Delta E^i_{mean}$ by the weighted average $$\Delta E^i_{mean}\left(\left\{p^{(i)}_{s_{i_1},\ldots,s_{i_{|E(i)|}}}\right\}\right) \equiv \sum_{s_{i_1},\ldots,s_{i_{|E(i)|}} \in \{-1,+1\}} p^{(i)}_{s_{i_1},\ldots,s_{i_{|E(i)|}}} |F_i(s_{i_1},\ldots,s_{i_{|E(i)|}})|. \quad (7)$$

Proceeding in a similar fashion as above, we introduce the following short-hand notation for the maximum of the weighted averages in Equation 7:

$$\Delta E'_{max} \equiv \max_{i \in \{1,\ldots,N\}} \Delta E^i_{mean}\left(\left\{p^{(i)}_{s_{i_1},\ldots,s_{i_{|E(i)|}}}\right\}\right) \quad (8)$$

Next we normalize the averages and obtain the normalized ratios $$r'_i \equiv \frac{\Delta E^i_{mean}\left(\left\{p^{(i)}_{s_{i_1},\ldots,s_{i_{|E(i)|}}}\right\}\right)}{\Delta E'_{max}} \quad (9)$$

Finally, if one wishes to use an anneal offset range of magnitude $2\delta_{range}$, then we can set the offsets to be $$\delta_i(r'_i) = \delta_{range}(1 - 2r'_i). \quad (10)$$

It could be that the function in Equation 10 assigns an anneal offset to a qubit that the hardware cannot physically realize. If $\delta_i^{max}$ is the maximum offset value that can be applied on qubit i allowed by the hardware, and $\delta_i^{min}$ is the minimum such offset value, we can ensure that $\delta_i \in [\delta_i^{min}, \delta_i^{max}]$ by using the following prescription:

$$\delta_i(r'_i) \equiv \begin{cases} \delta_i^{max} & \text{if } \delta_{range}(1 - 2r'_i) > \delta_i^{max} \\ \delta_i^{min} & \text{if } \delta_{range}(1 - 2r'_i) < \delta_i^{min} \\ \delta_{range}(1 - 2r'_i) & \text{else} \end{cases} \quad (11)$$

The following are several implementations that are computationally feasible even when the underlying hardware graph is of arbitrarily high degree (and in particular, for fully-connected graphs). The sum in Equation 7 is computationally tractable if enough of the weights $$p^{(i)}_{s_{i_1},\ldots,s_{i_{|E(i)|}}}$$

are 0 (note that this condition is sufficient for the sum in Equation 7 to be computationally tractable, but not necessary). One way of choosing the weights $$p^{(i)}_{s_{i_1},\ldots,s_{i_{|E(i)|}}}$$

in such a manner is to run multiple iterations of the optimization to obtain a sample of solutions using the default anneal offsets, and then choose the weights according to how frequently the corresponding combinations of qubits appear in the sampled solutions, or some subsample of the sampled solutions. For example, one might only consider the distribution occurring in the p % (for some $p \in [0,100]$) of the sampled solutions with the lowest energy (i.e., the best values of G).

One can repeat this procedure as an adaptive search to further refine the choices of the anneal offsets. In other words, every time a new sample of solutions is collected (i.e., after each call to the QCD), one can update weights $$p^{(i)}_{s_{i_1},\ldots,s_{i_{|E(i)|}}}$$

according to how frequently the corresponding configurations appear in the new sample of solutions, or some subsample of this new sample. As an example how one can use this subsample, one might only use the p % (for some p∈[0,100]) of the samples with the lowest energy.

Now the task is to find the values of the $s_1, \ldots, s_N$ that minimize the value of the formula in Equation 1, for example as described with respect to FIG. 1. In some cases, it could be that running the QCD with non-default anneal offsets results in decreased performance. One way of mitigating this risk is to alternate between calls to the QCD with the default annealing schedule, and calls with the desired non-default annealing schedule. With this hybrid strategy, in a worst case situation, the iterations using the default annealing schedule find the best solution and the iterations with the non-default annealing schedule are a waste of time. In that situation, the overall time-to-solution is guaranteed to be at worst two times greater than if one were to run the quantum annealer with only the default annealing schedule. At the other extreme, it is possible that the iterations with the default anneal offsets will not find the best solution but the iterations with the non-default anneal offsets will. In that case, the potential speed-up is unbounded.

One can generalize this method to mitigate the risk of using n−1 different annealing schedules, for any integer n∈[2, ∞). By alternating uniformly between calls to the QCD with the n−1 annealing schedules and a call to the QCD with the default annealing schedule, the overall time-to-solution is guaranteed to be at worst n times greater than if one were to run the QCD with only the default annealing schedule, whereas the potential speed-up remains unbounded.

Figure 2:
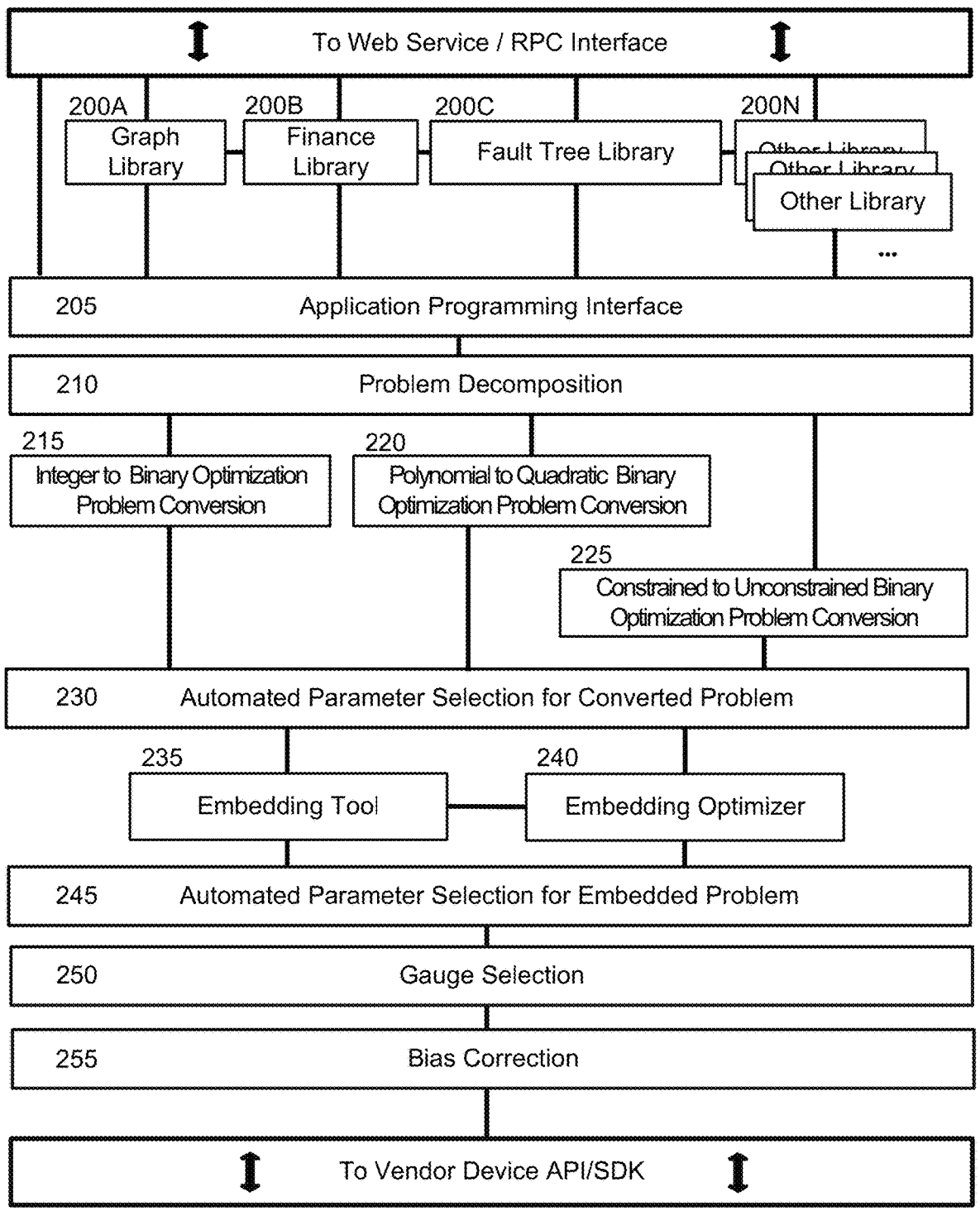
FIG. 2 is a logical diagram of a backend server suitable for use in providing quantum computing as a service (QCaaS).

FIG. 2 is a logical diagram of a backend server suitable for use in providing quantum computing as a service (QCaaS). The methods described above for setting anneal offsets may be used with such a system. Data flows into and out of the server via the interfaces at the top and bottom of the diagram. The web service/RPC interface at the top of FIG. 2 is user-facing. The vendor device API/SDK at the bottom connects to the hardware quantum computing device(s).

The backend server may contain one or more domain-specific libraries 200 that may be useful for developing software for or solving problems on quantum processing devices. Each domain-specific library may include software routines, data models, and other such resources as may typically appear in a software library. FIG. 2 specifically shows graph analytics 200A, finance 200B, and a fault tree 200C as domains where domain-specific libraries and routines may be especially useful, but library 200N emphasizes that any domain-specific library may be incorporated at this layer of the backend server. The numbering 200A-N emphasizes the extensible nature of the backend server. Based upon the components lower down in the diagram, any number of domain-specific libraries 200 may be written and integrated into the backend server. The functions 222, 224, 226 shown in FIG. 2 may be implemented as part of the fault tree library 200C.

The API 205 exposes the functions, data structures, models, and other core interfaces of the backend server. The API 205 may connect with one or more libraries 200A-N and/or may directly communicate with the web service/RPC interface, depending on the information being supplied to the backend server. The API 205 is responsible for examining a problem and whatever information is supplied to the backend server and determining how to execute the problem on quantum processing devices and/or classical solver libraries, with the help of the remaining modules shown in FIG. 2.

One such module is problem decomposition module 210. The processes conducted by this module involve taking a large problem and splitting it into smaller subproblems, whose solutions may be combined to obtain an exact or approximate solution to the entire problem. For example, if one is solving the Traveling Salesman Problem (TSP) for a large number of cities, there are heuristics in the literature for how to decompose the problem into multiple smaller TSP subproblems over smaller numbers of cities, and to then recombine the solutions of those subproblems into an approximate solution for the overall TSP problem.

The modules, 215, 220, and 225, relate to taking a discrete optimization problem of one form and converting it into a quadratic binary unconstrained form. Module 215 uses heuristics to convert an integer optimization problem into a binary optimization problem. Module 220 uses heuristics to convert a higher-order polynomial binary optimization problem into a quadratic binary optimization problem. Module 225 uses heuristics involving penalty terms to convert a constrained binary optimization problem into an unconstrained binary optimization problem. Depending on the input provided to the backend server, none, one, some, or all of these modules 215, 220, 225 may be used in order to prepare the problem for solution on the quantum processing devices and/or other solver libraries underlying the platform.

Module 230 provides optimizations for the processed problem in order to improve the quality of the solution obtained via the platform.

When the problem is in an optimized state, embedding tools 235, 240 may be run to fit the problem onto a model of the particular hardware architecture of a target quantum processing device. For instance, if a problem is to be solved using a D-Wave quantum processing device, these tools will map the problem onto the chimera graph architecture of that device. The embedding tool 235 may be vendor-supplied or a third-party library, whereas tool 240 can take the output of another embedding tool 235 and provide additional optimizations to make the embedding as compact as possible.

Tool 240 may operate by running the embedding tool 235 multiple times, and choosing the best result to use as the embedding (such may be the mode of operation when tool 235 produces different outputs for different executions). The "best" output of tool 235 may be the embedding with the fewest number of qubits used, the embedding with the shortest chain lengths, or some other criteria that may be specified. Other techniques may be incorporated into the platform for selecting and optimizing embeddings.

The embedded problem (output of tools 235 and/or 240) is then optimized for execution on a specific device via modules 245, 250, 255. The methods described above for selecting or adaptively tuning the annealing schedule may be implemented in module 245. At the very end of the process, the optimized problem is dispatched to one or more vendor device APIs/SDKs. At a later point in time, solutions are returned and are passed back to the end user.

Note that the collection of modules in the server-side platform library may be executed iteratively or in the style of a "feedback loop," where one or more of the modules are executed repeatedly, either in parallel or in serial. For example, one may wish to re-execute both the embedding routines 235 and then the automated parameter selection 245 in order to obtain a better embedding and better parameters (including annealing schedule) for the embedded problem. Generally, many of the modules, e.g. 230, 235, 240, 245, 250, 255, etc., may benefit from multiple executions, and as such, the platform may include options and modes for executing some or all of the modules repeatedly in the style of a feedback loop in order to obtain more suitable results. The platform does not restrict which modules may be run in this iterative fashion.

Although the detailed description contains many specifics, these should not be construed as limiting the scope of the disclosure but merely as illustrating different examples. It should be appreciated that the scope of the disclosure includes other embodiments not discussed in detail above. For example, instead of using Equation 5 where the anneal offset $\delta_i$ is a linear function of $r_i$, other monotonic functions could be used instead. Various other modifications, changes and variations which will be apparent to those skilled in the art may be made in the arrangement, operation and details of the method and apparatus disclosed herein without departing from the spirit and scope as defined in the appended claims. Therefore, the scope of the disclosure should be determined by the appended claims and their legal equivalents.

What is claimed is:

1. A method implemented on a digital computer system comprising a processor, the processor executing instructions to effect a method for solving a combinatorial optimization problem using a quantum computing device, the method comprising:
   receiving coefficients $h_i$ and $J_{ij}$ that define a combinatorial optimization problem to minimize $G=\Sigma_i h_i s_i + \Sigma_{(i,j)} J_{ij} s_i s_j$ with respect to qubits $s_i$;
   determining an annealing schedule of anneal offsets $\delta_i$ for the qubits $s_i$ based on a magnitude of a local field $F_i$ of each qubit $s_i$, where $F_i(\{s_k\})=h_i+\Sigma_k J_{ik} s_k$ and the summation is over indices k for which $k \neq i$ and $J_{ik} \neq 0$; and
   configuring and causing a quantum computing device to obtain a solution to the combinatorial optimization problem G using the annealing schedule $\delta_i$.

2. The method of claim 1 wherein the anneal offset $\delta_i$ for the qubit $s_i$ is determined based on an average $\Delta E^i$ of the magnitude of the local field $F_i(\{s_k\})$, and the average is taken over possible combinations of the qubits $\{s_k\}$.

3. The method of claim 2 wherein the average magnitude $\Delta E^i$ is based on a uniform weighting of the possible combinations of the qubits $\{s_k\}$.

4. The method of claim 2 wherein the average magnitude $\Delta E^i$ is based on a non-uniform weighting of the possible combinations of the qubits $\{s_k\}$.

5. The method of claim 2 wherein, over an operating range for the anneal offsets, the anneal offsets $\delta_i$ are a linear function of the average magnitude $\Delta E^i$.

6. The method of claim 2 wherein, over an operating range for the anneal offsets, the anneal offsets $\delta_i$ are a monotonic function of the average magnitude $\Delta E^i$.

7. The method of claim 2 wherein, over an operating range for the anneal offsets, the anneal offsets $\delta_i$ are a monotonically decreasing function of the average magnitude $\Delta E^i$.

8. The method of claim 2 wherein values of the anneal offsets $\delta_i$ are clipped to stay within an operating range for the anneal offsets.

9. The method of claim 1 wherein the quantum computing device is a quantum annealer or am adiabatic quantum computer.

10. A method implemented on a digital computer system comprising a processor, the processor executing instructions to effect a method for solving a combinatorial optimization problem using a quantum computing device, the method comprising:
   receiving coefficients $h_i$ and $J_{ij}$ that define a combinatorial optimization problem to minimize $G=\Sigma_i h_i s_i + \Sigma_{(i,j)} J_{ij} s_i s_j$ with respect to qubits $s_i$;
   repeatedly for multiple iterations:
      determining an annealing schedule of anneal offsets $\delta_i$ for the qubits $s_i$; and
      configuring and causing a quantum computing device to obtain a solution to the combinatorial optimization problem G using the annealing schedule $\delta_i$;
      wherein, for at least one of the iterations, the annealing schedule of anneal offsets $\delta_i$ is based on a magnitude of a local field $F_i$ of each qubit $s_i$, where $F_i(\{s_k\})=h_i+\Sigma_k J_{ik} s_k$ and the summation is over indices k for which $k \neq i$ and $J_{ik} \neq 0$; and
   selecting from among the solutions obtained in the multiple iterations.

11. The method of claim 10 wherein, for the at least one iteration:
   the anneal offset $\delta_i$ for the qubit $s_i$ is determined based on an average $\Delta E^i$ of the magnitude of the local field $F_i(\{s_k\})$;
   the average is a weighted average taken over possible combinations of the qubits $\{s_k\}$; and
   weights for the weighted average are based on a frequency of the actual combinations of the qubits $\{s_k\}$ occurring in solutions obtained in prior iterations.

12. The method of claim 11 wherein the weights for the weighted average are based on a frequency of the actual combinations of the qubits $\{s_k\}$ occurring in solutions obtained in prior iterations that are below a threshold energy.

13. The method of claim 11 wherein the weights for the weighted average are based on a frequency of the actual combinations of the qubits $\{s_k\}$ occurring in a predetermined fraction of lowest energy solutions obtained in prior iterations.

14. The method of claim 11 wherein the weights for the weighted average are based on a frequency of the actual combinations of the qubits $\{s_k\}$ occurring in solutions obtained in prior iterations that used a default annealing schedule.

15. The method of claim 11 wherein the weights for the weighted average are adaptively updated as additional solutions are obtained in additional iterations.

16. The method of claim 11 wherein iterations that use a default annealing schedule are interspersed with iterations that use annealing schedules based on the average $\Delta E^i$.

17. A computing system for solving a combinatorial optimization problem, comprising:
   a digital computer system; and
   a quantum computing device;
   wherein the digital computer system:
      receives coefficients $h_i$ and $J_{ij}$ that define a combinatorial optimization problem to minimize $G=\Sigma_i h_i s_i + \Sigma_{(i,j)} J_{ij} s_i s_j$ with respect to qubits $s_i$;
      determines an annealing schedule of anneal offsets $\delta_i$ for the qubits $s_i$ based on a magnitude of a local field $F_i$ of each qubit $s_i$, where $F_i(\{s_k\})=h_i+\Sigma_k J_{ik} s_k$ and the summation is over indices k for which $k \neq i$ and $J_{ik} \neq 0$; and configures and causes the quantum computing device to obtain a solution to the combinatorial optimization problem G using the annealing schedule $\delta_i$.

18. The computing system of claim 17 wherein the digital computer system:
for multiple iterations:
  determines an annealing schedule of anneal offsets $\delta_i$ for the qubits $s_i$; and
  configures and causes the quantum computing device to obtain a solution to the combinatorial optimization problem G using the annealing schedule $\delta_i$;
  wherein, for at least one of the iterations, the annealing schedule is the annealing schedule based on a magnitude of a local field $F_i$ of each qubit $s_i$, where $F_i(\{s_k\}) = h_i + \Sigma_k J_{ik} s_k$ and the summation is over indices k for which $k \neq i$ and $J_{ik} \neq 0$; and
selects from among the solutions obtained in the multiple iterations.

19. The computing system of claim 17 wherein the digital computer system functions as a master machine and the quantum computing device functions as a worker machine controlled by the master machine.

20. The computing system of claim 17 wherein the quantum computing device is available as a shared service to the digital computer system and to other digital computer systems.

* * * * *